Patented July 25, 1944

2,354,578

UNITED STATES PATENT OFFICE 2,354,578

METHOD OF MANUFACTURING CERTAIN ACYLATED POLYAMINO ETHERS

Melvin De Groote, University City, and Bernhard Keiser, Webster Groves, Mo., assignors to Petrolite Corporation, Ltd., Wilmington, Del., a corporation of Delaware No Drawing. Application April 3, 1942, Serial No. 437,608

8 Claims. (Cl. 260—404.5)

The present invention is concerned primarily with a new procedure or method for producing certain aminoethers which either have not been previously available, or could not be prepared except by laborious methods, which involved either excessive cost, or else, a preponderance of cogeneric by-products.

Said new method of manufacturing the herein described aminoethers, is of utility, in view of the reaction products obtained. Such reaction products find employment in demulsification of crude oil emulsions, in de-salting practice in oil refineries, as break inducers in the doctor treatment of sour hydrocarbons, in acidification of calcareous oil-bearing strata, and for various other uses where cation-active reagents are employed.

The reactants employed in the present method consist of (a) Certain acylated aminoalcohols which must have at least one acyl radical derived from a monobasic detergent-forming acid, and at least one basic amino nitrogen atom, i. e., an amino nitrogen atom not directly linked to an acyl radical or an aryl radical. Such reactants may have more than one basic amino nitrogen atom, and may also have an ether linkage; and (b) High molal amines having at least one hydroxy hydrocarbon radical, or the equivalent, in which the carbon atom chain is interrupted at least once by oxygen.

The types of materials employed as reactants are well known.

In regard to the acylated aminoalcohols used as reactants, one type, a monoamino type, is described in U. S. Patent No. 2,225,824, dated December 24, 1940, to De Groote and Wirtel. Said patent describes in detail the manufacture of compounds of the following formula:

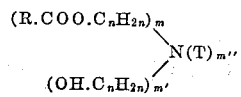

in which R.COO represents the oxyacyl radical derived from a monobasic detergent-forming acid; T represents a hydrogen atom or a nonhydroxy hydrocarbon radical or the acylated radical obtained by replacing a hydrogen atom of the hydroxyl group of an alkylol radical by the acyl radical of a monobasic carboxy acid having less than 8 carbon atoms; $n$ represents a small whole number which is less than 10; $m$ represents the numeral 1, 2, or 3; $m'$ represents the numeral 0, 1, or 2; and $m''$ represents the numeral 0, 1, or 2, with the proviso that $m+m'+m''$ equals 3.

A similar type of compound, which contains an ether linkage, is described in U. S. Patent No. 2,259,704, dated October 21, 1941, to Monson and Anderson. In said patent there is a description of acylated aminoethers containing (a) A radical derived from a basic hydroxyaminoether, and said radical being of the kind containing at least one amino nitrogen free from attached aryl and amido-linked acyl radicals; said hydroxyaminoether radical being further characterized by the presence of at least one radical derived from a basic hydroxyamine and being attached by at least one ether linkage to at least one radical selected from the class consisting of glycerol radicals, polyglycerol radicals, polyglycol radicals, basic hydroxyamine radicals, amido hydroxyamine radicals, and aryl alkanolamine radicals; said basic hydroxyaminoether radical being characterized by containing not over 60 carbon atoms; and (b) an acyl radical derived from a detergent-forming monocarboxy acid having at least 8 carbon atoms and not more than 32 carbon atoms; said acylated aminoether being additionally characterized by the fact that said aforementioned acyl radical is a substituent for a hydrogen atom of an alcoholic hydroxyl radical.

Although primarily, raw materials, such as triethanolamine, ethyldiethanolamine, and the like, are most frequently employed in the manufacture of the acylated aminoalcohol, it is understood that such materials may be reacted with an oxyethylating agent, such as ethylene oxide, propylene oxide, or the like, to produce comparable materials which also are well known compounds. (See also U. S. Patents Nos. 2,228,986, 7, 8 and 9, all dated January 4, 1941, to De Groote, Keiser and Blair). If desired, the acylated aminoalcohols of the kind previously described may be subjected to a subsequent oxyalkylation step, i. e., treatment with ethylene oxide or the like. For example, the ester derived from ricinoleic acid and triethanolamine could be subjected to treatment with ethylene oxide, propylene oxide, or the like. As has been previously pointed out, such acylated aminoalcohols containing at least one basic amino nitrogen atom, need not be obtained from monoamines, or monoaminoalcohols, but may, in fact, be obtained from polyaminoalcohols. Thus, hydroxyethyl ethylenediamine may be treated with three moles of ethylene oxide, so as to obtain tetra(hydroxyethyl)ethylenediamine. Such product can be readily acylated wtih a high molal detergent-forming acid. Similarly, diethylenetriamine can be treated with four moles of ethylene oxide, so as to yield a tetra-substituted product. The compound obtained can be acylated with two moles of a suitably selected detergent-forming acid, for example, a higher fatty acid, to give a suitable acylated aminoalcohol having at least two basic nitrogen atoms. Furthermore, in the broadest aspect, one is not limited to acylated derivatives in which the acyloxy radical of the detergent-forming acid enters into ahe aminoalcohol, but one may employ compounds in which the acyl group, as distinguished from the acyloxy group, in introduced into the amino reactant. For example, ethylenediamine, or diethylenetriamine, may be treated with a detergent-forming monocarboxy acid, so as to yield the acylated polyamine. Such polyamine can then be treated with ethylene oxide or the like, so as to convert it into an aminoalcohol. Insofar that there are two or more amino nitrogen atoms present, obviously, there must be at least one basic nitrogen atom, provided that only partial amidification has been employed.

As to the high molal amines, one is concerned with the type which represents, in essence, the oxyalkylation derivatives of high molal primary or secondary amines. It is well known that such amines can be treated with ethylene oxide, propylene oxide, butylene oxide, glycid, or the like, to give hydroxylated derivatives. Such amines, if primary amines, can be treated with one, two, ten, or twenty moles of ethylene oxide or any suitable alkylating agent. The same is true in event a secondary amine is employed. As to a complete description of such amines, reference is made to U. S. Patent No. 2,246,842, dated June 24, 1941, to Melvin De Groote. However, there is this difference in said De Groote patent—the amines therein contemplated are restricted by the fact that the ether linkages must not occur three times or more. In the present instance, there is no restriction as to the recurrence of ether linkages, and furthermore, in said last mentioned patent there is no proviso that a hydroxylated group or its equivalent must necessarily be present, whereas, such group is a functional group in the present instance and must appear as part of the amine. In other words, one employs a high molal alkylolamine having present at least one hydrocarbon radical containing a carbon atom chain of an acyl radical of a detergent-forming monocarboxy acid having more than 8 carbon atoms and not more than 32 carbon atoms.

The monocarboxy detergent-forming acids are characterized by having at least 8 carbon atoms and not more than 32 carbon atoms, and are exemplified by fatty acids, naphthenic acids, abietic acids, acids obtained by the oxidation of petroleum or wax, and the like, or simple modifications thereof which do not detract from the ability of the acid to combine with alkali to produce soap or soap-like materials. For instance, hydrogenated oleic acid, chlorinated naphthenic acid, or brominated abietic acid, will form such detergent-like bodies with the same ease as the parent material itself. The oxidized acids obtained by blowing or oxidation of the acids or esters are satisfactory. Such acids have frequently been referred to collectively in the art as "monocarboxy detergent acids." Needless to say, the acylation need not be conducted by means of the acid itself, but may be conducted by means of any compound of the acid which contains the acyl radical; for instance, an ester, an amide, an anhydride, an acyl chloride, etc.

Preferably, the reactions involve the acyl radical obtained from a fatty acid, and more particularly, an unsaturated acid. Our preference is to use such materials as castor oil, ricinoleic acid, oleic acid, sunflowerseed oil, soyabean oil, teaseed oil, linseed oil, and the like. The amines employed are preferably those obtained by the oxyethylation of high molal amines, such as the tertiary amines obtained by oxyethylation of octadecenylamine; cetylamine; stearylamine; oleoamine; ricinoleoamine; amines derived from naphthenic acids; amines derived from octadecadiene 9,11-acid-1; octadecylamine; amines derived from mixed unsaturated fatty acids, such as soyabean fatty acids; cottonseed oil fatty acids; linseed oil fatty acids; heptadecylamine, hexadecylamine; dodecylamine; decylamine, etc.

Although the reactants employed are well known, a few examples will be given.

BASIC ACYLATED AMINOALCOHOLS

*Example 1*

Ricinoleic acid is reacted with triethanolamine in the conventional manner to give a compound of the following formula:

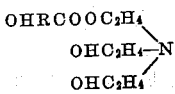

BASIC ACYLATED AMINOALCOHOLS

*Example 2*

The same procedure is allowed as in the preceding example, except that the triethanolamine is treated with three moles of ethylene oxide prior to acylation with ricinoleic acid.

BASIC ACYLATED AMINOALCOHOLS

*Example 3*

Ethyldiethanolamine is substituted for triethanolamine in Examples 1 and 2, preceding.

BASIC ACYLATED AMINOALCOHOLS

*Example 4*

Triisopropanolamine or propyldiisopropanolamine is employed, following the same procedure as described in Examples 1 to 3, preceding.

BASIC ACYLATED AMINOALCOHOLS

*Example 5*

Hydroxyethyl ethylenediamine is reacted with three moles of ethylene oxide and then with one mole of ricinoleic acid so as to give a compound of the following composition:

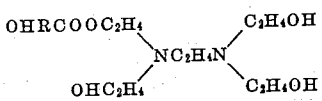

BASIC ACYLATED AMINOALCOHOLS

*Example 6*

Diethylenetriamine is treated with four moles of ethylene oxide and then with two moles of ricinoleic acid.

The compounds described in the preceding examples are well known compositions and the method of preparation is well known.

Hydroxylated High Molal Amines
Example 1

One mole of octadecenylamine is treated with two moles of ethylene oxide to give a corresponding tertiary amine, indicated by the formula:

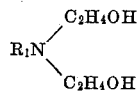

in which $R_1$ is the high molal aliphatic radical.

Hydroxylated High Molal Amines
Example 2

Cetylamine is substituted for octadecenylamine in Example 1, preceding, indicated by the formula:

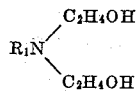

in which $R_1$ is the high molal aliphatic radical.

Hydroxylated High Molal Amines
Example 3

Stearylamine is substituted for octadecenylamine in Example 1, preceding, indicated by the formula:

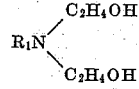

in which $R_1$ is the high molal aliphatic radical.

Hydroxylated High Molal Amines
Example 4

Oleoamine is substituted for octadecenylamine in Example 1, preceding, indicated by the formula:

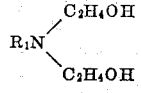

in which $R_1$ is a high molal aliphatic radical derived from commercial oleic acid.

Hydroxylated High Molal Amines
Example 5

Amines derived from naphthenic acids are substituted for octadecenylamine, in Example 1, preceding, indicated by the formula:

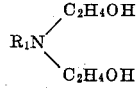

in which $R_1$ is a high molal radical derived from naphthenic acid.

Hydroxylated High Molal Amines
Example 6

Octadecylamine is substituted for octadecenylamine, in Example 1, preceding, indicated by the formula:

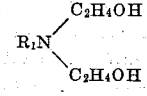

in which $R_1$ is a radical derived from technically pure stearic acid.

We have found that if one mixes the types of reactants indicated, in low molar proportions, for instance, mole for mole, in any instance, and two moles to a single mole where there is a multiple of functional groups, one can then heat such mixtures to a point below the pyrolytic point of either reactant alone and obtain etherization with the elimination of one or more moles of water. In other words, if one were to take a hydroxylated high molalamine of the kind described, for instance, bis(hydroxyethyl)octadecylamine, one might find that it would have to be heated to 300° C. or higher, before marked etherization took place. Similarly, one might heat a basic acylated aminoalcohol, for instance, the derivative obtained by one mole of ricinoleic acid with one mole of triethanolamine to a temperature short of its pyrolytic point, for instance, 270° C., without the elimination of a mole of water, and yet, if one mixes a mixture of the two reactants in equal molar proportions, and heats the same, one will find that water can be eliminated readily at a temperature considerably lower than the pyrolytic point of either reactant. For instance, such mixture might only be heated to a temperature of 225°–270° C. Needless to say, where at least one of the reactants is polyfunctional, one might use two moles of the other reactants. For example, two moles of a hydroxylated amine of the kind just described might be reacted with one mole of a material described under the heading "Basic acylated aminoalcohols, Example 6." Likewise, the reactants can be selected so that one can use two moles of the amine for one mole of the alcohol. Our preference, however, is to use mole for mole, regardless of whether the reactants are polyfunctional or not.

Etherization Procedure
Example 1

One pound mole of a material described under the heading "Basic acylated aminoalcohols, Example 1" is mixed with one pound mole of bis(hydroxyethyl)octadecylamine and the mixture heated to a point above 200° C. and below the pyrolytic point of the individual reactants, until etherization has taken place with elimination of water. 4 to 20 hours may be required. Although more complicated reactions may take place, in one of the simplest aspects the reaction may be indicated in the following manner:

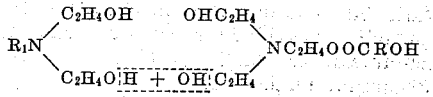

Etherization Procedure
Example 2

The same procedure is employed, except that instead of employing the material described under the heading "Basic acylated aminoalcohols, Example 1," one employs a material of the kind described under the headings "Basic acylated aminoalcohols, Examples 2 to 4," inclusive. Although more complicated reactions may take place, in one of the simplest aspects the reaction may be indicated in the following manner:

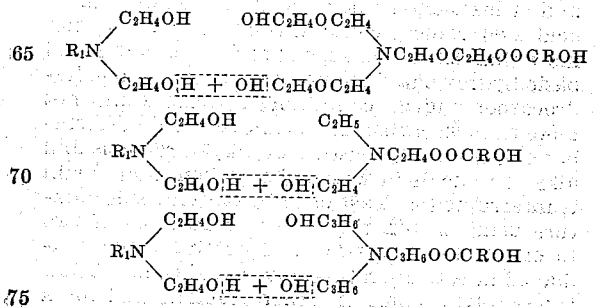

ETHERIZATION PROCEDURE

Example 3

The same procedure is employed, except that instead of employing the material described under the heading "Basic acylated aminoalcohols, Example 1," one employs a material of the kind described under the headings "Basic acylated aminoalcohols, Examples 5 and 6." Although more complicated reactions may take place, in one of the simplest aspects the reaction may be indicated in the following manner:

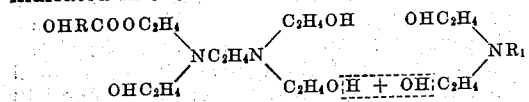

ETHERIZATION PROCEDURE

Example 4

The same procedure is followed as in Example 3 proceeding, except that one employs two pound moles of the amine for each pound mole of the acylated aminoalcohol.

ETHERIZATION PROCEDURE

Example 5

One pound mole of hexadecylamine is treated with one pound mole of ethylene oxide. One pound mole of the material so obtained is reacted with one pound mole of the acylated aminoalcohol obtained by reaction between ricinoleic acid and triethanolamine in equal molar proportions. Methylhexadecylamine may be employed instead of hexadecylamine.

The products obtained in the above manner may be employed as such for various purposes indicated, or may be used as intermediate reactions in the production of more complex compounds. Being basic in nature, they can combine with any suitable acids, such as hydrochloric acid, acetic acid, lactic acid, or the like, to produce acid salts. Many of such acid salts have pronounced emulsifying and surface tension depressant qualities.

It is recognized that etherization could take place between two molecules of the same kind of reactant, but it is our opinion that the etherization which takes place is substantially heteromolecular etherization, i. e., etherization involving two dissimilar molecules.

Attention is directed to our co-pending applications Serial Nos. 437,609 and 437,610 both filed April 3, 1942.

Having thus described our invention, what we claim as new and desire to secure by Letters Patent is:

1. In the method of manufacturing acylated polyaminoethers having at least one monocarboxy detergent-forming acid acyl radical and at least two basic amino nitrogen atoms, the step of heating a mixture of (a) an acylated aminoalcohol having at least one basic nitrogen atom and at least one monocarboxy detergent-forming acid acyl radical containing at least 8 and not more than 32 carbon atoms; and (b) a high molal basic hydroxylated amine having at least one hydrocarbon radical containing at least 8 and not more than 32 carbon atoms and at least one member of the class consisting of alkylol radicals and alkylol radicals in which the carbon atom chain is interrupted at least once by oxygen; said mixture being within the molar proportions of two to one and one to two; said heating being conducted at a temperature above 160° C. and below the pyrolytic point of either reactant and for a period of time to insure heteromolecular etherization.

2. In the method of manufacturing acylated polyaminoethers having at least one monocarboxy detergent-forming acid acyl radical and at least two basic amino nitrogen atoms, the step of heating a mixture of (a) an acylated monoaminoalcohol having at least one basic nitrogen atom and at least one monocarboxy detergent-forming acid acyl radical containing at least 8 and not more than 32 carbon atoms; and (b) a high molal basic hydroxylated amine having at least one hydrocarbon radical containing at least 8 and not more than 32 carbon atoms and at least one member of the class consisting of alkylol radicals and alkylol radicals in which the carbon atom chain is interrupted at least once by oxygen; said mixture being within the molar proportions of two to one and one to two; said heating being conducted at a temperature above 160° C. and below the pyrolytic point of either reactant and for a period of time to insure heteromolecular etherization.

3. In the method of manufacturing acylated polyaminoethers having at least one monocarboxy detergent-forming acid acyl radical and at least two basic amino nitrogen atoms, the step of heating a mixture of (a) an acylated monoaminoalcohol having at least one basic nitrogen atom and at least one monocarboxy detergent-forming acid acyl radical containing at least 8 and not more than 32 carbon atoms; and (b) a high molal basic hydroxylated monoamine having at least one hydrocarbon radical containing at least 8 and not more than 32 carbon atoms and at least one member of the class consisting of alkylol radicals and alkylol radicals in which the carbon atom chain is interrupted at least once by oxygen; said mixture being within the molar proportions of two to one and one to two; said heating being conducted at a temperature above 160° C. and below the pyrolytic point of either reactant and for a period of time to insure heteromolecular etherization.

4. In the method of manufacturing acylated polyaminoethers having at least one monocarboxy detergent-forming acid acyl radical and at least two basic amino nitrogen atoms, the step of heating an equimolar mixture of (a) an acylated monoaminoalcohol having at least one basic nitrogen atom and at least one monocarboxy detergent-forming acid acyl radical containing at least 8 and not more than 32 carbon atoms; and (b) a high molal basic hydroxylated monoamine having at least one hydrocarbon radical containing at least 8 and not more than 32 carbon atoms and at least one member of the class consisting of alkylol radicals and alkylol radicals in which the carbon atom chain is interrupted at least once by oxygen; said heating being conducted at a temperature above 160° C. and below the pyrolytic point of either reactant and for a period of time to insure heteromolecular etherization.

5. In the method of manufacturing acylated polyamino-ethers having at least one higher fatty acid acyl radical and at least two basic amino nitrogen atoms, the step of heating an equimolar mixture of (a) an acylated monoaminoalcohol having at least one basic nitrogen atom and at least one higher fatty acid acyl radical containing at least 8 and not more than 32 carbon atom; and (b) a high molal basic hydroxylated monoamine having at least one hyrocarbon radical containing at least 8 and not more than 32 carbon atoms and at least one member of the class consisting of alkylol radicals and alkylol radicals in which the carbon atom chain is interrupted at least once by oxygen; said heating being conducted at a temperature above 160° C. and below the pyrolytic point of either reactant and for a period of time of insure heteromolecular etherization.

6. In the method of manufacturing acylated polyamino-ethers having at least one unsaturated higher fatty acid acyl radical and at least two basic amino nitrogen atoms, the step of heating an equimolar mixture of (a) an acylated monoaminoalcohol having at least one basic nitrogen atom and at least one unsaturated higher fatty acid acyl radical containing at least 8 and not more than 32 carbon atoms; and (b) a high molal basic hydroxylated monoamine having at least one hydrocarbon radical containing at least 8 and not more than 32 carbon atoms and at least one member of the class consisting of alkylol radicals and alkylol radicals in which the carbon atom chain is interrupted at least once by oxygen; said heating being conducted at a temperature above 160° C. and below the pyrolytic point of either reactant and for a period of time to insure heteromolecular etherization.

7. In the method of manufacturing acylated polyaminoethers having at least one unsaturated higher fatty acid acyl radical having 18 carbon atoms and at least two basic amino nitrogen atoms, the step of heating an equimolar mixture of (a) an acylated monoaminoalcohol having at least one basic nitrogen atoms and at least one unsaturated higher fatty acid acyl radical having 18 carbon atoms; and (b) a high molal basic hydroxylated monoamine having at least one hydrocarbon radical containing at least 8 and not more than 32 carbon atoms and at least one member of the class consisting of alkylol radicals and alkylol radicals in which the carbon atom chain is interrupted at least once by oxygen; said heating being conducted at a temperature above 160° C. and below the pyrolytic point of either reactant and for a period of time to insure heteromolecular etherization.

8. In the method of manufacturing acylated polyaminoethers having at least one ricinoleyl radical and at least two basic amino nitrogen atoms, the step of heating an equimolar mixture of (a) an acylated monoaminoalcohol having at least one basic nitrogen atom and at least one ricinoleyl radical; and (b), a high molar basic hydroxylated monoamine having at least one hydrocarbon radical containing at least 8 and not more than 32 carbon atoms and at least one member of the class consisting of alkylol radicals and alkylol radicals in which the carbon atom chain is interrupted at least once by oxygen; said heating being conducted at a temperature above 160° C. and below the pyrolytic point of either reactant and for a period of time to insure heteromolecular etherization.

MELVIN DE GROOTE.
BERNHARD KEISER.